US011862140B2

(12) United States Patent
McCutcheon et al.

(10) Patent No.: US 11,862,140 B2
(45) Date of Patent: Jan. 2, 2024

(54) AUDIO SYSTEM AND SIGNAL PROCESSING METHOD FOR AN EAR MOUNTABLE PLAYBACK DEVICE

(71) Applicant: ams AG, Premstätten (AT)

(72) Inventors: Peter McCutcheon, Premstaetten (AT); Horst Gether, Premstaetten (AT)

(73) Assignee: AMS AG, Premstätten (AT)

( * ) Notice: Subject to any disclaimer, the term of this patent is extended or adjusted under 35 U.S.C. 154(b) by 292 days.

(21) Appl. No.: 17/440,953

(22) PCT Filed: Mar. 18, 2020

(86) PCT No.: PCT/EP2020/057466
§ 371 (c)(1),
(2) Date: Sep. 20, 2021

(87) PCT Pub. No.: WO2020/193315
PCT Pub. Date: Oct. 1, 2020

(65) Prior Publication Data

US 2022/0223133 A1 Jul. 14, 2022

(30) Foreign Application Priority Data

Mar. 22, 2019 (EP) .................................... 19164677
May 14, 2019 (EP) .................................... 19174437

(51) Int. Cl.
*G10K 11/178* (2006.01)
*G10L 25/78* (2013.01)
(Continued)

(52) U.S. Cl.
CPC .. *G10K 11/17854* (2018.01); *G10K 11/17823* (2018.01); *G10K 11/17825* (2018.01);
(Continued)

(58) Field of Classification Search
None
See application file for complete search history.

(56) References Cited

U.S. PATENT DOCUMENTS 4,494,074 A 1/1985 Bose
5,138,664 A 8/1992 Kimura et al.
(Continued)

FOREIGN PATENT DOCUMENTS

CN 102293013 A 12/2011
CN 107211204 A 9/2017
(Continued)

OTHER PUBLICATIONS

Notice of Reasons for Rejection (with English Translation) in Japanese Application No. 2021-556994 dated Oct. 4, 2022, 11 pages.
(Continued)

*Primary Examiner* — Qin Zhu
(74) *Attorney, Agent, or Firm* — MH2 TECHNOLOGY LAW GROUP LLP

(57) ABSTRACT

An audio system for an ear mountable playback device includes a speaker, an error microphone, which senses sound being output from the speaker, and a sound control processor. The processor is configured for controlling and/or monitoring a playback of a detection signal or a filtered version of the detection signal via the speaker, recording an error signal from the error microphone, and determining whether the playback device is in a first state, where the playback device is worn by a user, or in a second state, where the playback device is not worn by a user, based on processing of the error signal.

19 Claims, 5 Drawing Sheets

(51) Int. Cl.
*H04R 1/10* (2006.01)
*H04R 29/00* (2006.01)

(52) U.S. Cl.
CPC .. *G10K 11/17835* (2018.01); *G10K 11/17881* (2018.01); *G10L 25/78* (2013.01); *H04R 1/1041* (2013.01); *H04R 1/1083* (2013.01); *G10K 2210/1081* (2013.01); *G10K 2210/3026* (2013.01); *G10K 2210/3027* (2013.01); *G10K 2210/3028* (2013.01); *G10K 2210/3056* (2013.01); *H04R 2460/01* (2013.01)

(56) References Cited

U.S. PATENT DOCUMENTS

| | | | | |
|---|---|---|---|---|
| 9,838,812 | B1 | 12/2017 | Shetye et al. | |
| 9,894,452 | B1 | 2/2018 | Termeulen et al. | |
| 2004/0196992 | A1 | 10/2004 | Ryan | |
| 2007/0036377 | A1 | 2/2007 | Stirnemann | |
| 2010/0189269 | A1 | 7/2010 | Haartsen et al. | |
| 2010/0246845 | A1 | 9/2010 | Burge et al. | |
| 2014/0126733 | A1* | 5/2014 | Gauger, Jr. ...... | G10K 11/17835 381/71.6 |
| 2014/0126734 | A1* | 5/2014 | Gauger, Jr. ...... | G10K 11/17853 381/71.6 |
| 2014/0126735 | A1* | 5/2014 | Gauger, Jr. ...... | G10K 11/17837 381/71.6 |
| 2014/0126736 | A1* | 5/2014 | Gauger, Jr. ...... | G10K 11/17837 381/71.6 |
| 2014/0126756 | A1* | 5/2014 | Gauger, Jr. ...... | G10K 11/17857 381/71.6 |
| 2015/0124977 | A1 | 5/2015 | Srivastava et al. | |
| 2017/0013345 | A1 | 1/2017 | Kumar et al. | |
| 2017/0148428 | A1* | 5/2017 | Thuy .................... | H04R 1/1083 |
| 2017/0171657 | A1 | 6/2017 | Liu et al. | |
| 2018/0115815 | A1 | 4/2018 | Kumar et al. | |
| 2018/0124532 | A1* | 5/2018 | Shetye ................... | H04R 5/033 |
| 2018/0225082 | A1 | 8/2018 | An et al. | |

FOREIGN PATENT DOCUMENTS

| | | | |
|---|---|---|---|
| CN | 110291581 | A | 9/2019 |
| EP | 3451327 | A1 | 3/2019 |
| EP | 3503572 | A1 | 6/2019 |
| JP | 2013528830 | A | 7/2013 |
| JP | 2014033303 | A | 2/2014 |
| WO | 2018085025 | A1 | 5/2018 |

OTHER PUBLICATIONS

Chinese Office Action (with English Translation) in Chinese Application No. 202080016107.9 dated Jun. 17, 2023, 16 pages.

European Extended Search Report in corresponding EP Application No. 19174437.4 dated Mar. 24, 2020, 14 pages.

International Search Report and Written Opinion in corresponding International Application No. PCT/EP2020/057466 dated Jun. 9, 2020, 13 pages.

* cited by examiner

AUDIO SYSTEM AND SIGNAL PROCESSING METHOD FOR AN EAR MOUNTABLE PLAYBACK DEVICE

CROSS-REFERENCE TO RELATED APPLICATIONS

The present application is the national stage entry of International Patent Application No. PCT/EP2020/057466, filed on Mar. 18, 2020, and published as WO 2020/193315 A1 on Oct. 1, 2020, which claims the benefit of priority of European Patent Application Nos. 19164677.7, filed on Mar. 22, 2019, and 19174437.4, filed on May 14, 2019, all of which are incorporated by reference herein in their entirety.

BACKGROUND OF THE INVENTION

The present disclosure relates to an audio system and to a signal processing method, each for an ear mountable playback device, e.g. a headphone, comprising a speaker and a microphone.

Nowadays a significant number of headphones, including earphones, are equipped with noise cancellation techniques. For example, such noise cancellation techniques are referred to as active noise cancellation or ambient noise cancellation, both abbreviated with ANC. ANC generally makes use of recording ambient noise that is processed for generating an anti-noise signal, which is then combined with a useful audio signal to be played over a speaker of the headphone. ANC can also be employed in other audio devices like handsets or mobile phones.

Various ANC approaches make use of feedback, FB, microphones, feedforward, FF, microphones or a combination of feedback and feedforward microphones.

FF and FB ANC is achieved by tuning a filter based on given acoustics of a system.

Hybrid noise cancellation headphones are generally known. For instance, a microphone is placed inside a volume that is directly acoustically coupled to the ear drum, conventionally close to the front of the headphones driver. This is referred to as the feedback (FB) microphone. A second microphone, the feed-forward (FF) microphone is placed on the outside of the headphone, such that it is acoustically decoupled from the headphones driver.

However, there are still headphones without ANC. Both types of headphones, with or without ANC, may have included some kind of processing or other electronic components that consume power during operation. For example, wireless headphones use rechargeable batteries for providing power to the components.

Many headphones and earphones feature some form of off ear detection, i.e. a detection whether the headphone is on the ear or off the ear or, if the headphone is worn by a user or not. As the trend with headphones is now to become wireless, battery power and playback time is of critical importance and so off ear detection is desired to avoid draining the battery e.g. by disabling music playback, the Bluetooth connection and other features when it is taken off the head.

For example, this can be done by several means including optical proximity sensors, pressure sensors and capacitive sensors. All of these require adding an extra sensor into the device solely for this purpose, and designing the device to package that sensor such that it works effectively, which may impact the aesthetics or increase cost in manufacture.

SUMMARY OF THE INVENTION

The present disclosure provides an improved concept for detecting the wearing state of an ear mountable playback device like a headphone, earphone or mobile handset.

This disclosure e.g. puts forward a way to detect if the headphone is in or on the ear or not by use of two microphones, one on the inside of the headphone and one on the outside. In a conventional hybrid noise cancelling headphone, these two microphones are already present, so the application of this disclosure in a hybrid noise cancelling headphone is to add an off ear detection without adding additional components. It should be noted that even if a headphone or earphone is referenced in the following, this stands as a general example for any ear mountable playback device like a headphone, earphone or mobile handset, e.g. a mobile phone. In case of a headphone or earphone, the headphone or earphone may be designed to be worn with a variable acoustic leakage between a body of the headphone or earphone and a head of a user.

A conventional noise cancelling headphone e.g. features a driver with an air volume in front and behind it. The front volume is made up in part by the ear canal volume. The front volume usually consists of a vent which is covered with an acoustic resistor. The rear volume also typically features a vent with an acoustic resistor. Often the front volume vent acoustically couples the front and rear volumes. There may be two microphones per channel, left and right. The error, or feedback (FB) microphone is placed in close proximity to the driver such that it detects sound from the driver and sound from the ambient environment. The feed-forward (FF) microphone is placed facing out from the rear of the unit such that it detects ambient sound, and negligible sound from the driver.

With this arrangement, two forms of noise cancellation can take place, feed-forward and feedback. Both systems involve a filter in place between the microphone and the driver.

The primary use for this disclosure relates to an adaptive noise cancellation system whereby the properties of these filters are altered in response to the ambient noise level at the error microphone to compensate for leakage. However it can also be applied to any noise cancelling headphone, or a non-noise cancelling headphone when a known signal like a music signal or a known noise signal is output from the speaker.

For the purposes of this disclosure, adaptive noise cancellation refers to a process whereby the anti-noise signal is changed, i.e. adapted, in real-time in response to changing acoustic leakage from the front air volume.

When applied to noise cancelling headphones or earphones, this disclosure inter alia removes the need for an additional sensor to detect when a headphone is on or off the ear. This saves costs in the bill of material, BOM, for the headphone and can remove design constraints in having to place an additional sensor.

Wireless headphones should be power efficient, and one risk is that they can run flat if taken off the head and not switched off, or to a low power mode. An on-off ear detection is also desirable to wake up a device or to move a device out of a low power mode, e.g. into a regular mode of operation, when placed into/onto the ear.

Furthermore, in an adaptive noise cancelling headphone, detecting when the earphone has been placed on or off the ear allows the system to maintain stability by avoiding adaption of ANC filter functions when off the ear.

Conventionally an adaptive noise cancellation system will minimise noise at a specific reference point. In a headphone, this would be the ear canal volume, ear drum or most likely the FB noise cancellation microphone. If the headphone is taken off the head, the acoustic situation can be vastly different which may cause the adaptive algorithm to go unstable, or to set extreme noise cancellation parameters such that on replacing the headphone onto the head, substantial noise boosting may be heard before adaption can continue. On-off ear detection can be used to pause the adaptive system when the headphone is taken off the head. Hence, the disclosed acoustic approach to off ear detection helps avoiding the use of e.g. an additional proximity sensor which could increase the costs.

The improved concept according to the present disclosure may use acoustic components already present in a noise cancelling headphone to detect when the headphone is on or off the head.

For example, an audio system is disclosed for an ear mountable playback device that comprises a speaker and an error microphone that senses sound being output from the speaker. The error microphone may be a feedback microphone for FB ANC. The error microphone may predominantly sense the sound being output from the speaker but also senses sound from the ambient environment. Predominantly sensing sound being output from the speaker may be achieved by respective placement of the error microphone within the playback device with respect to the speaker such that e.g. ambient sound is recorded more or less as a side effect, depending on an actual leakage conditions.

The audio system comprises a sound control processor that is configured for controlling and/or monitoring a playback of a detection signal or a filtered version of the detection signal via the speaker; recording an error signal from the error microphone; and determining whether the playback device is in a first state, where the playback device is worn by a user, or in a second state, where the playback device is not worn by a user, based on processing of the error signal.

Hence, there are two main processes that run in the audio system. One is to detect the headphone going off the ear (second state), and one is to detect the headphone being replaced onto the ear (first state).

By controlling and/or monitoring the playback, the sound control processor consequently controls the signal being output by the speaker or at least has access to the signal being output.

In some implementations, the audio system is configured to perform noise cancellation. For example, the playback device further comprises a feedforward microphone that predominantly senses ambient sound, and preferably only a negligible portion of sound output by the speaker. The sound control processor is further configured for recording a noise signal from the feedforward microphone and using the noise signal as the detection signal; filtering the detection signal with a feedforward filter; and controlling the playback of the filtered detection signal via the speaker.

To detect the headphone going off the ear, the resultant filter response of an adaptive noise cancelling algorithm, in particular for the feedforward filter, may be analysed, and an off ear state is triggered if the resultant filter response meets certain criteria. This is e.g. if the resultant filter response does not match within an acceptable tolerance, an expected acoustics response that dictates an on-ear case. For example, the sound control processor is configured to adjust a filter response of the feedforward filter based on the error signal and to determine the second state based on an evaluation of the filter response of the feedforward filter at at least one predetermined frequency. For instance the sound control processor is configured to determine the second state if the filter response of the feedforward filter at the at least one predetermined frequency exceeds a response threshold value.

In some implementations, the sound control processor is configured to determine the second state by determining a linear regression of the filter response of the feedforward filter in a predefined frequency range, the linear regression being defined by at least a filter gradient and a filter gain, and by evaluating the filter gradient and/or the filter gain. For example, the sound control processor is configured to determine the second state if at least one of the following applies: the filter gradient exceeds a threshold gradient value; the filter gain exceeds a threshold gain value.

A lower limit of the predefined frequency range may be between 40 Hz and 100 Hz and an upper limit of the predefined frequency range may be between 100 Hz and 800 Hz.

In the case of a non-adaptive earphone, the ANC performance is analysed by monitoring the ratio of energy at the error microphone and the FF microphone. If the ANC performance is particularly poor, the headphone is assumed to be off the ear. In this case, a voice activity detector may be used to check that speech is not present when the ANC performance value is calculated. For example, the sound control processor is configured to determine the second state based on an evaluation of a performance of the noise cancellation as a function of the error signal and the noise signal or detection signal.

To detect the headphone going on the ear, the phase of the error microphone relative to the FF microphone is monitored. This ultimately takes advantage of the vast differences in driver response when on and off the ear due to the difference in acoustic load. When the phase of the driver response in a pre-defined region goes beyond a set threshold, the earphone is deemed to be back on the ear.

For example, the sound control processor is configured to determine the first state based on an evaluation of a phase difference between the detection signal and the error signal. In some of such implementations, the sound control processor is configured to determine the first state, if the phase difference between the detection signal and the error signal exceeds a phase threshold value at one or more predefined frequencies. The evaluation of the phase difference may be performed in the frequency domain.

It may seem sensible to apply the on ear phase monitoring approach to the off ear case also. However, this may become unreliable in the presence of speech. Imbalances in bone conducted speech signals at the error and FF microphones could result in unreliable phase information. However, when off the ear, bone conducted speech signals are negligible.

Similarly, the off ear detection method cannot be applied to the on ear detection in every situation, as the detection relies upon the adaption running for adaptive headphones and adaption will have been paused as a result of the off ear detection. For non-adaptive audio systems, it is feasible that monitoring the ANC performance can also be used for the on ear detection. Hence, for example, the sound control processor is configured to determine the first state based on an evaluation of a performance of the noise cancellation as a function of the error signal and the noise signal or detection signal.

When an off ear state has been triggered, and adaption is paused, several other features can also be disabled such as music playback and Bluetooth connection. Whilst the acoustic components and noise cancellation processor must still run to detect an on ear case, this can run in a low power mode. This mode can include running at a lower sampling rate, including clocking the microphones or ADCs at a lower sample rate which could be substantially lower than twice frequency of the upper threshold of human hearing. (I.e. the useful microphone information, and useful signals through the IC could have a restricted bandwidth that is lower than it would for acceptable operation with normal use). For example, a sampling rate of the microphone(s) data could be reduced to 8 kHz.

When music is playing, off ear detection can become more complex. For a non-adaptive headphone, the energy level of the music may be calculated after being offset for the driver response and removed from the error microphone. The ANC approximation becomes:

$$ANC = \frac{err - Mus \cdot DFBM}{FF}$$

Where all values are assumed to be energy levels, err is the error signal, Mus is the known music signal, DFBM is the driver response at the error microphone and FF is the energy at the FF microphone. As this ANC approximation is to trigger a binary state (on/off ear), it is acceptable that its calculation is not exact.

For adaptive headphones with music playing, the music signal convolved with an approximation of the driver response can be subtracted from the error microphone signal.

The approximation of the driver response is adapted. This may be acceptable except when music is very loud. In this case, the off ear detection may be calculated by comparing the adapted driver response filter to a known driver response which is at the limit of going off the ear (described in more detail below). This later process can also be used for headphones without ANC provided there is an error microphone present.

In the case of voice being present in most cases, a voice activity detector may need to pause off ear detection when voice is detected.

For example, the audio system further comprises a voice activity detector for determining whether a voice signal is recorded with the error microphone and/or the feedforward microphone, wherein the sound control processor is configured to pause a determination of the first and/or the second state, if the voice signal is determined to be recorded.

In some implementations, the sound control processor is configured to evaluate the performance of the noise cancellation by determining an energy ratio between the error signal and the noise signal or detection signal. For example, the sound control processor is configured, if a music signal is additionally played via the speaker, to take an energy level of the music signal into account when determining the energy ratio.

In some implementations a filter response of the feedforward filter is constant and/or is kept constant by the sound control processor at least during the determination of the state of the playback device. This may improve the accuracy of the evaluation of the noise cancellation performance In some further implementations, the detection signal is an identification signal, wherein the sound control processor is configured to control and/or monitor the playback of the identification signal via the speaker; to filter the identification signal with an adjustable filter; to adjust the adjustable filter based on a difference between the filtered identification signal and the error signal, e.g. such that the adjustable filter approximates an acoustic transfer function between the speaker and the error microphone; and to determine the second state based on an evaluation of a filter response of the adjustable filter at at least one further predetermined frequency.

The identification signal may be one of the following or a combination of one of the following: a music signal; a payload audio signal; a filtered version of a noise signal that is recorded from a microphone predominantly sensing ambient sound. The latter microphone may also be available as an FF ANC microphone.

Evaluation of the filter response may be done similarly as an evaluation of the filter response of an adaptive feedforward filter as described above, e.g. by evaluating a gain and/or a gradient, particularly at a predetermined frequency or in a specified frequency range as discussed above.

For instance the sound control processor is configured to determine the second state if the filter response of the adjustable filter at the at least one further predetermined frequency exceeds an identification response threshold value.

In some implementations, the sound control processor is configured to determine the second state by determining a linear regression of the filter response of the adjustable filter in a further predefined frequency range, the linear regression being defined by at least an identification filter gradient and an identification filter gain, and by evaluating the identification filter gradient and/or the identification filter gain. For example, the sound control processor is configured to determine the second state if at least one of the following applies: the identification filter gradient exceeds an identification threshold gradient value; the identification filter gain exceeds an identification threshold gain value.

Similar as in the implementations described above, a lower limit of the further predefined frequency range may be between 40 Hz and 100 Hz and an upper limit of the further predefined frequency range may be between 100 Hz and 800 Hz.

In some implementations, the sound control processor is configured to control the audio system to a low power mode of operation, if the second state is determined, and to a regular mode of operation, if the first state is determined. In some implementations, it is determined whether the playback device is in the first state, only if the playback device is in the second state, and whether the playback device is in the second state, only if the playback device is in the first state.

The audio system may include the playback device. For example, the sound control processor is included in a housing of the playback device.

The improved concept for detecting the wearing state of an ear mountable playback device may also be implemented in a signal processing method for an ear mountable playback device comprising a speaker and an error microphone that senses, e.g. predominantly senses, sound being output from the speaker.

For example, the method comprises controlling and/or monitoring a playback of a detection signal or a filtered version of the detection signal via the speaker; recording an error signal from the error microphone; and determining whether the playback device is in a first state, where the playback device is worn by a user, or in a second state, where the playback device is not worn by a user, based on processing of the error signal.

Further embodiments of the method become readily apparent to the skilled reader from the various implementations of the audio system described above.

In various embodiments, a headphone or earphone or head mounted device which comprises a driver which is mounted in a housing whereby the rear face of the driver may be enclosed by a rear air volume and the front face of the driver may be enclosed by a front air volume, a front vent which acoustically couples the front volume to the ambient environment via an acoustic resistor, a rear vent which acoustically couples the rear volume to the ambient environment, a feed-forward microphone which detects sound in the ambient environment, an error microphone positioned in close proximity to the front driver face and detects sound from the ambient environment and sound from the driver. For example, the signal from the feed-forward microphone is electronically filtered to produce a signal from the driver which attenuates ambient noise at the error microphone location and the error microphone signal can control the properties of said electronic filter, whereby the properties of the electronic filter are monitored and compared to at least one pre-defined property, which when the at least pre-defined property are exceeded enters an off ear mode which changes how the error signal controls the electronic filter.

When in an off ear mode, the phase difference is monitored between the two microphones such that when the phase difference exceeds a pre-defined threshold, an on ear state is defined and the error signal controls the properties of the electronic filter as before.

The headphone may be designed to be worn with an acoustic leakage between the headphone body and the head.

The headphone may create an acoustic seal between the volume in front of the driver and the ear canal.

An acoustic mesh may cover the rear vent.

Upon entering an off ear mode, the error microphone may cease to control the electronic filter.

In some implementations the error microphone signal also passes through an additional filter and is output of the driver to create an additional feedback noise cancellation system.

The off ear mode may run slower or consume less power.

In various embodiments, a headphone or earphone or head mounted device comprises a driver which is mounted in a housing whereby the rear face of the driver is enclosed by a rear air volume and the front face of the driver is enclosed by a front air volume, a front vent which may acoustically couple the front volume to the ambient environment via an acoustic resistor, a rear vent which may acoustically couple the rear volume to the ambient environment, an error microphone positioned in close proximity to the front driver face and detecting sound from the ambient environment and sound from the driver.

A wanted audio signal can be played out of the headphone driver, whereby the signal detected by the error microphone is used to adapt an electronic filter that bears a close resemblance to the driver response, whereby the properties of the electronic filter are monitored and compared to a pre-defined property(ies), which when the pre-defined property(ies) are exceeded enters an off ear mode which changes how the error signal controls the electronic filter.

When in an off ear mode, the phase difference between the known signal and the error microphone is monitored such that when the phase difference exceeds a pre-defined threshold, an on ear state is defined and the error signal controls the properties of the electronic filter as before.

The wanted audio signal may be an amplified, filtered version of the signal from a FF microphone.

In all of the embodiments described above, ANC can be performed both with digital and/or analog filters. All of the audio systems may include feedback ANC as well. Processing and recording of the various signals is preferably performed in the digital domain

BRIEF DESCRIPTION OF THE DRAWINGS

The improved concept will be described in more detail in the following with the aid of drawings. Elements having the same or similar function bear the same reference numerals throughout the drawings. Hence their description is not necessarily repeated in following drawings.

In the drawings.

DETAILED DESCRIPTION

Figure 1:
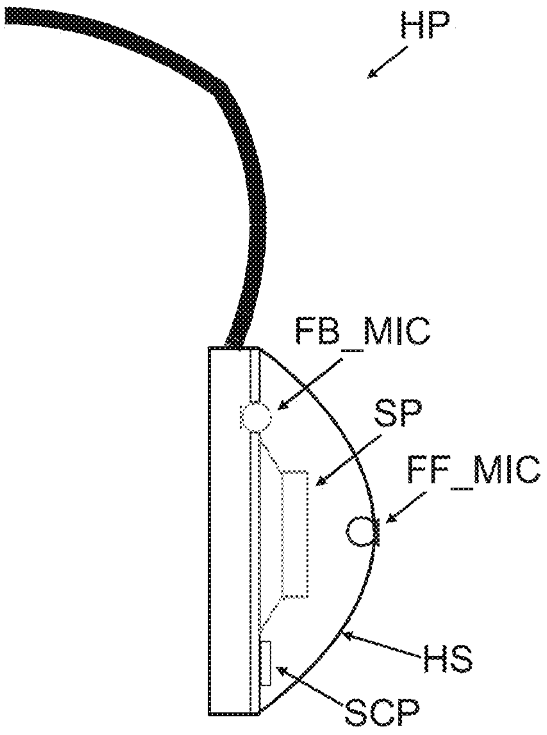
FIG. 1 shows a schematic view of a headphone.

FIG. 1 shows a schematic view of an ANC enabled playback device in form of a headphone HP that in this example is designed as an over-ear or circumaural headphone. Only a portion of the headphone HP is shown, corresponding to a single audio channel. However, extension to a stereo headphone will be apparent to the skilled reader for this and the following disclosure. The headphone HP comprises a housing HS carrying a speaker SP, a feedback noise microphone or error microphone FB_MIC and an ambient noise microphone or feedforward microphone FF_MIC. The error microphone FB_MIC is particularly directed or arranged such that it records both sound played over the speaker SP and ambient noise. Preferably the error microphone FB_MIC is arranged in close proximity to the speaker, for example close to an edge of the speaker SP or to the speaker's membrane, such that the speaker sound may be the predominant source for recording. The ambient noise/feedforward microphone FF_MIC is particularly directed or arranged such that it mainly records ambient noise from outside the headphone HP. Still, negligible portions of the speaker sound may reach the microphone FF_MIC.

Depending on the type of ANC to be performed, the ambient noise microphone FF_MIC may be omitted, if only feedback ANC is performed. The error microphone FB_MIC may be used according to the improved concept to provide an error signal being the basis for a determination of the wearing condition, respectively leakage condition, of the headphone HP, when the headphone HP is worn by a user.

In the embodiment of FIG. 1, a sound control processor SCP is located within the headphone HP for performing various kinds of signal processing operations, examples of which will be described within the disclosure below. The sound control processor SCP may also be placed outside the headphone HP, e.g. in an external device located in a mobile handset or phone or within a cable of the headphone HP.

Figure 2:
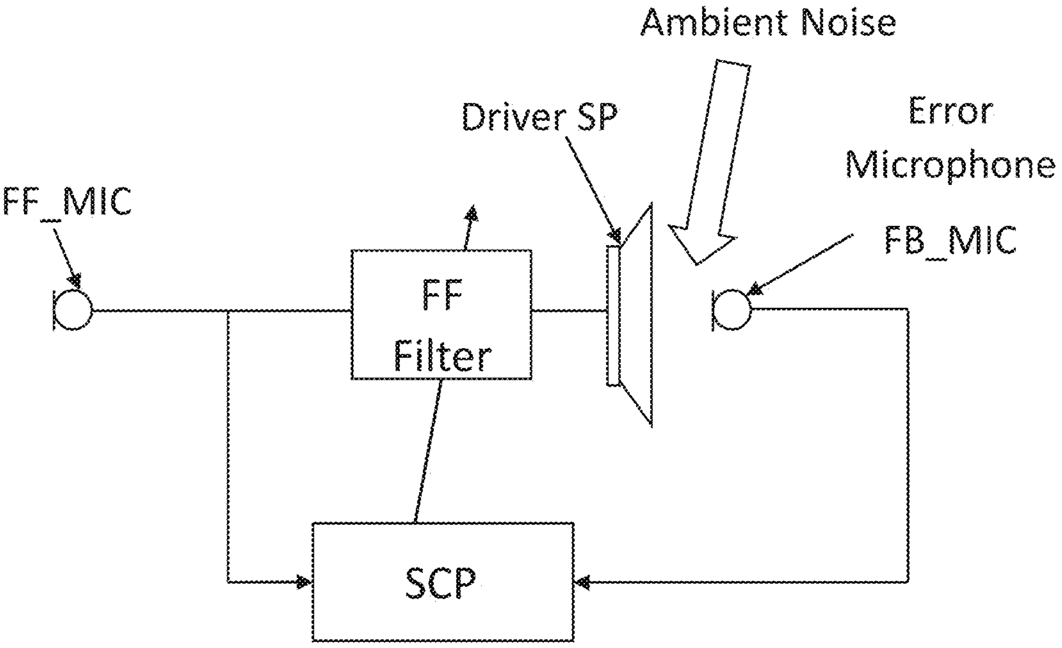
FIG. 2 shows a block diagram of a generic adaptive ANC system.

FIG. 2 shows a block diagram of a generic adaptive ANC system. The system comprises the error microphone FB_MIC and the feedforward microphone FF_MIC, both providing their output signals to the sound control processor SCP. The noise signal recorded with the feedforward microphone FF_MIC is further provided to a feedforward filter for generating and anti-noise signal being output via the speaker SP. At the error microphone FB_MIC, the sound being output from the speaker SP combines with ambient noise and is recorded as an error signal that includes the remaining portion of the ambient noise after ANC. This error signal is used by the sound control processor SCP for adjusting a filter response of the feedforward filter.

Figure 3:
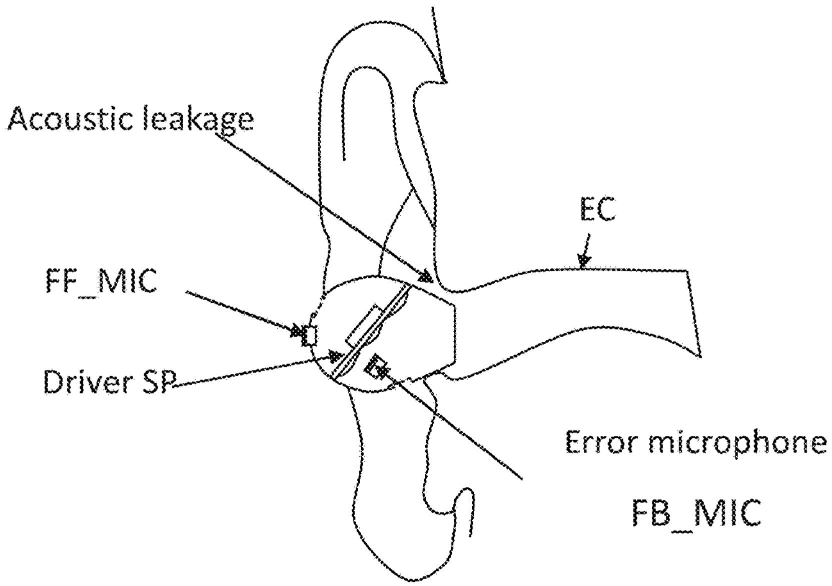
FIG. 3 shows an example representation of a “leaky” type earphone.

FIG. 3 shows an example representation of a "leaky" type earphone, i.e. an earphone featuring some acoustic leakage between the ambient environment and the ear canal EC. In particular, a sound path between the ambient environment and the ear canal EC exists, denoted as "acoustic leakage" in the drawing.

Figure 4:
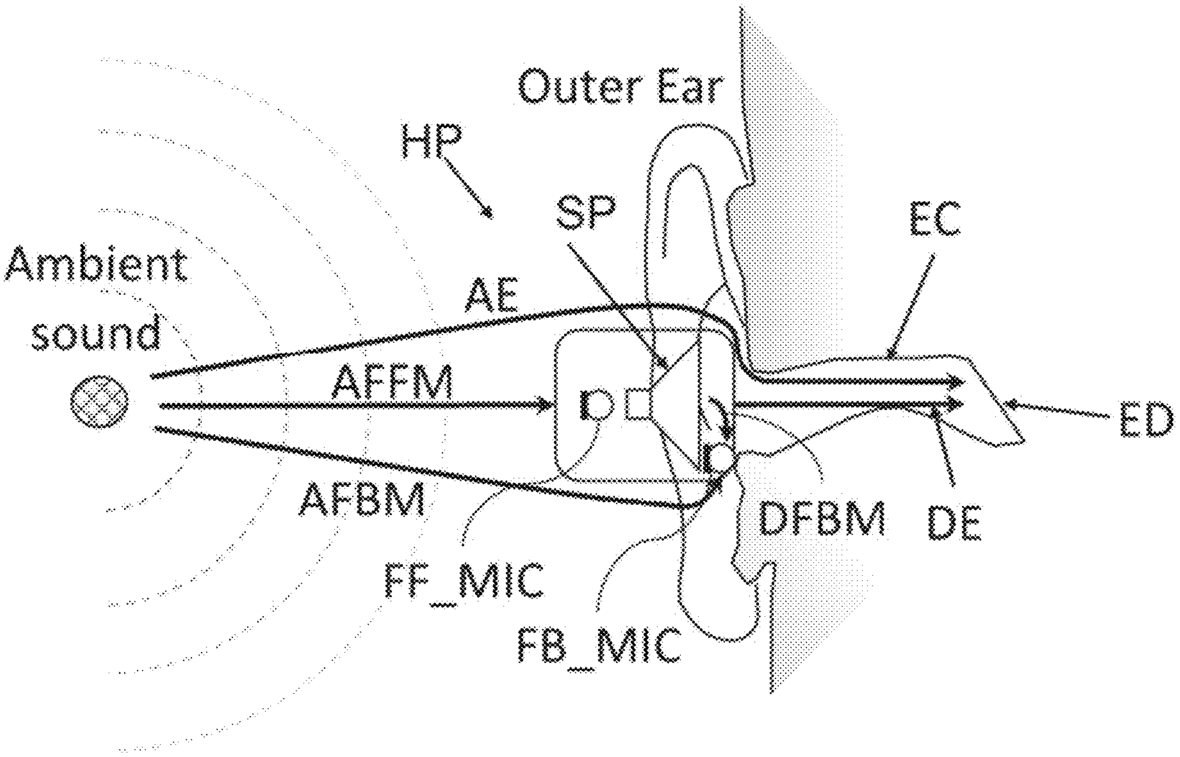
FIG. 4 shows an example headphone worn by a user with several sound paths from an ambient sound source.

FIG. 4 shows an example configuration of a headphone HP worn by a user with several sound paths. The headphone HP shown in FIG. 4 stands as an example for any ear mountable playback device of a noise cancellation enabled audio system and can e.g. include in-ear headphones or earphones, on-ear headphones or over-ear headphones. Instead of a headphone, the ear mountable playback device could also be a mobile phone or a similar device.

The headphone HP in this example features a loudspeaker SP, a feedback noise microphone FB_MIC and, optionally, an ambient noise microphone FF_MIC, which e.g. is designed as a feedforward noise cancellation microphone. Internal processing details of the headphone HP are not shown here for reasons of a better overview.

In the configuration shown in FIG. 4, several sound paths exist, of which each can be represented by a respective acoustic response function or acoustic transfer function. For example, a first acoustic transfer function DFBM represents a sound path between the speaker SP and the feedback noise microphone FB_MIC, and may be called a driver-to-feedback response function. The first acoustic transfer function DFBM may include the response of the speaker SP itself. A second acoustic transfer function DE represents the acoustic sound path between the headphone's speaker SP, potentially including the response of the speaker SP itself, and a user's eardrum ED being exposed to the speaker SP, and may be called a driver-to-ear response function. A third acoustic transfer function AE represents the acoustic sound path between the ambient sound source and the eardrum ED through the user's ear canal EC, and may be called an ambient-to-ear response function. A fourth acoustic transfer function AFBM represents the acoustic sound path between the ambient sound source and the feedback noise microphone FB_MIC, and may be called an ambient-to-feedback response function.

If the ambient noise microphone FF_MIC is present, a fifth acoustic transfer function AFFM represents the acoustic sound path between the ambient sound source and the ambient noise microphone FF_MIC, and may be called an ambient-to-feedforward response function.

Response functions or transfer functions of the headphone HP, in particular between the microphones FB_MIC and FF_MIC and the speaker SP, can be used with a feedback filter function B and feedforward filter function F, which may be parameterized as noise cancellation filters during operation.

The headphone HP as an example of the ear-mountable playback device may be embodied with both the microphones FB_MIC and FF_MIC being active or enabled such that hybrid ANC can be performed, or as a FB ANC device, where only the feedback noise microphone FB_MIC is active and an ambient noise microphone FF_MIC is not present or at least not active. Hence, in the following, if signals or acoustic transfer functions are used that refer to the ambient noise microphone FF_MIC, this microphone is to be assumed as present, while it is otherwise assumed to be optional.

Any processing of the microphone signals or any signal transmission are left out in FIG. 4 for reasons of a better overview. However, processing of the microphone signals in order to perform ANC may be implemented in a processor located within the headphone or other ear-mountable playback device or externally from the headphone in a dedicated processing unit. The processor or processing unit may be called a sound control processor. If the processing unit is integrated into the playback device, the playback device itself may form a noise cancellation enabled audio system. If processing is performed externally, the external device or processor together with the playback device may form the noise cancellation enabled audio system. For example, processing may be performed in a mobile device like a mobile phone or a mobile audio player, to which the headphone is connected with or without wires.

In the various embodiments, the FB or error microphone FB_MIC may be located in a dedicated cavity, as for example detailed in ams application EP17208972.4.

Figure 5:
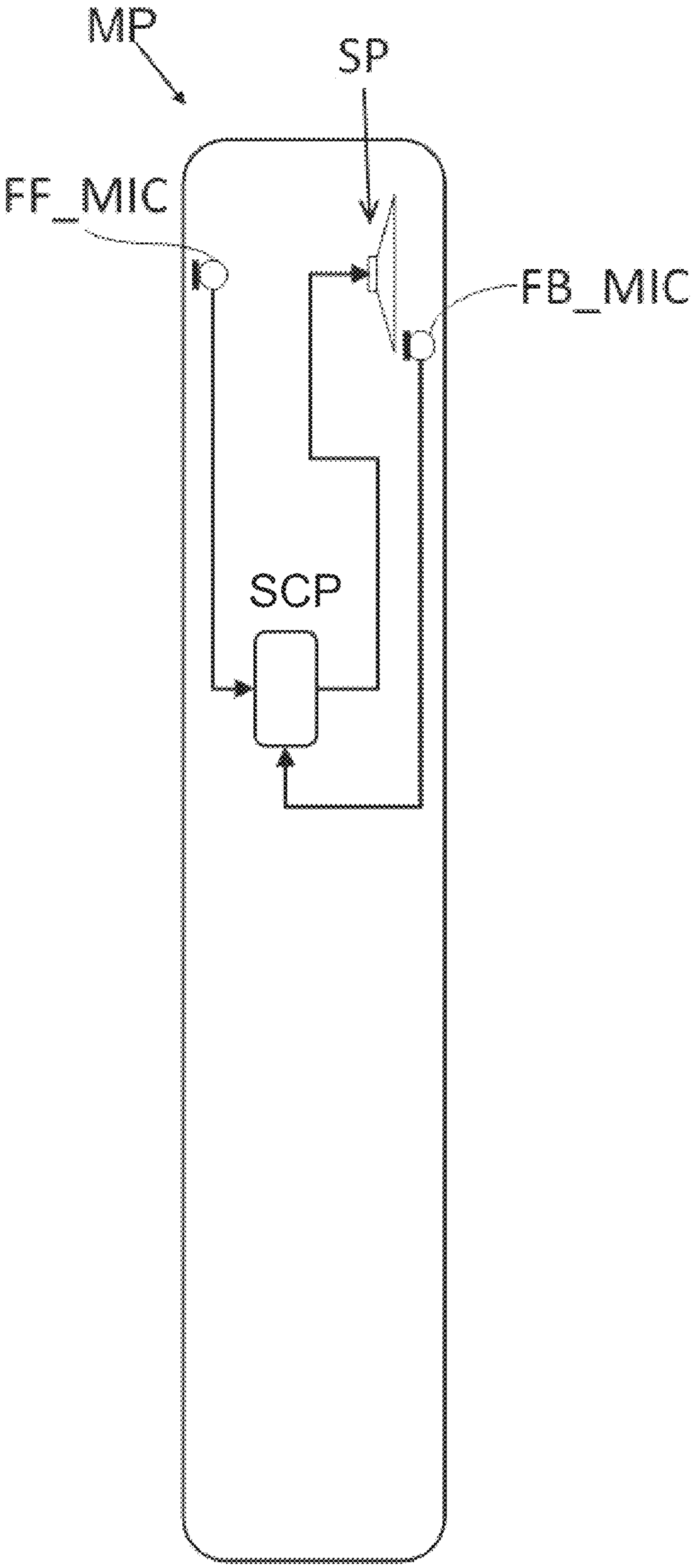
FIG. 5 shows an example representation of an ANC enabled handset.

Referring now to FIG. 5, another example of a noise cancellation enabled audio system is presented. In this example implementation, the system is formed by a mobile device like a mobile phone MP that includes the playback device with speaker SP, feedback or error microphone FB_MIC, ambient noise or feedforward microphone FF_MIC and a sound control processor SCP for performing inter alia ANC and/or other signal processing during operation.

In a further implementation, not shown, a headphone HP, e.g. like that shown in FIG. 1 or FIG. 4, can be connected to the mobile phone MP wherein signals from the microphones FB_MIC, FF_MIC are transmitted from the headphone to the mobile phone MP, in particular the mobile phone's processor PROC for generating the audio signal to be played over the headphone's speaker. For example, depending on whether the headphone is connected to the mobile phone or not, ANC is performed with the internal components, i.e. speaker and microphones, of the mobile phone or with the speaker and microphones of the headphone, thereby using different sets of filter parameters in each case.

In the following, several implementations of the improved concept will be described in conjunction with specific use cases. It should however be apparent to the skilled person that details described for one implementation may still be applied to one or more of the other implementations.

Generally, the following steps are performed, e.g. with the sound control processor SCP:

- controlling and/or monitoring a playback of a detection signal or a filtered version of the detection signal via the speaker SP;
- recording an error signal from the error microphone FB_MIC; and
- determining whether the headphone or other playback device HP is in a first state, where the playback device HP is worn by a user, or in a second state, where the playback device HP is not worn by a user, based on processing of the error signal.

1. Adaptive Headphone with Ear Cushion

In one embodiment of this disclosure there is a headphone with a front volume which is directly acoustically coupled to the ear canal volume of a user, a driver SP which faces into the front volume and a rear volume which surrounds the rear face of the driver SP. The rear volume may have a vent with an acoustic resistor to allow some pressure relief from the rear of the driver. The front volume may also have a vent with an acoustic resistor to allow some pressure relief at the front of the driver. An error microphone FB_MIC is placed facing the front face of the driver such that it detects ambient noise and the signals from the front of the driver; and a feedforward microphone FF_MIC is placed facing out of the rear of the headphone such that it detects ambient noise, but detects negligible signals from the driver SP. An ear cushion surrounds the front face of the driver and makes up part of the front volume.

In normal operation the headphone is placed on a user's head such that a complete or partial seal is made between the ear cushion and the users head, thereby at least in part acoustically coupling the front volume to the ear canal volume.

The feedforward microphone FF_MIC, the error microphone FB_MIC and driver SP are connected to the sound control processor SCP acting as a noise cancellation processor. Referring to FIG. 2, a noise signal detected by the FF microphone FF_MIC is routed through a FF filter and ultimately the headphone speaker SP, producing an anti-noise signal such that FF noise cancellation occurs at the error microphone point, and consequently the ear drum reference point (DRP). The noise signal is used as the detection signal. The error signal from the error microphone FB_MIC is routed to an adaption engine in the sound control processor SCP that in some way changes the anti-noise signal that is output from the speaker by changing at least one property of the FF filter to optimise noise cancellation at the error microphone FB_MIC.

The sound control processor SCP periodically monitors the FF filter response at at least one frequency and compares this to a predefined set of acceptable filter responses which are stored in a memory of the sound control processor SCP. If the FF filter response is judged to be beyond the acceptable filter responses, an off ear state, i.e. second state, is triggered and the adaption engine ceases to change the FF filter in response to the error microphone signal. For instance, the FF filter is set to a low leak setting.

For example, the FF filter may in some part represent the inverse of the low frequency characteristics of the driver response. The resultant FF filter response may be analysed at three low frequencies: 80 Hz, 100 Hz and 130 Hz. A different selection of the number of frequencies and the frequency range selected from this is possible. For example, a lower limit of a predefined frequency range may be between 40 Hz and 100 Hz and an upper limit of the predefined frequency range may be between 100 Hz and 800 Hz.

Therefore a linear regression may determine the gradient and gain of this FF filter. In this example there is one acceptable filter response stored in memory as a gradient and gain scalar values which e.g. represent a linear regression of the inverse of the low frequency portion of the driver response when it is almost off the ear, that is with a high acoustic leakage between the ear cushion and the head. When the gradient of the linear regression of the FF filter becomes greater than the acceptable threshold filter gradient, or if the gain is greater than the acceptable threshold filter gain value, then an off ear state is triggered.

The FF filter may be a close match of the transfer function:

$$\frac{AE}{AFFM \cdot DE}$$

where AE is the ambient to ear transfer function, AFFM is the ambient to FF microphone transfer function and DE is the driver to ear transfer function.

When the headphone is in the off ear state, i.e. second state, the sound control processor SCP stops running unnecessary processes such as music playback and Bluetooth connection and switches to a low power mode with may include clocking processes at a lower rate, and which may include clocking the microphone ADCs at a lower rate.

In this second state, the sound control processor SCP monitors the signals from the error and FF microphones and the sound control processor SCP calculates a phase difference of these two signals, i.e. the detection signal and the error signal.

The phase calculation may occur by taking the argument of an FFT of the two signals and dividing them, then analysing when e.g. the mean of several bins from the FFT division moves beyond a threshold.

The phase detection may occur by filtering each time domain signal, the filter may be one or more DFTs or implementations of the Goertzel algorithm at at least one frequency. The division of phase response of these two filtered signals at each frequency can give the phase difference at each frequency. For instance, the mean of these phase differences can be compared to a threshold.

The phase detection may occur entirely in the time domain.

If the phase difference moves beyond the threshold, then the earphone is returned to an on ear state, i.e. the first state. The FF filter is reset to a known stable state and adaption is re-enabled, that is the error signal from the error microphone FB_MIC continues to have an effect on the FF filter.

Figure 6:
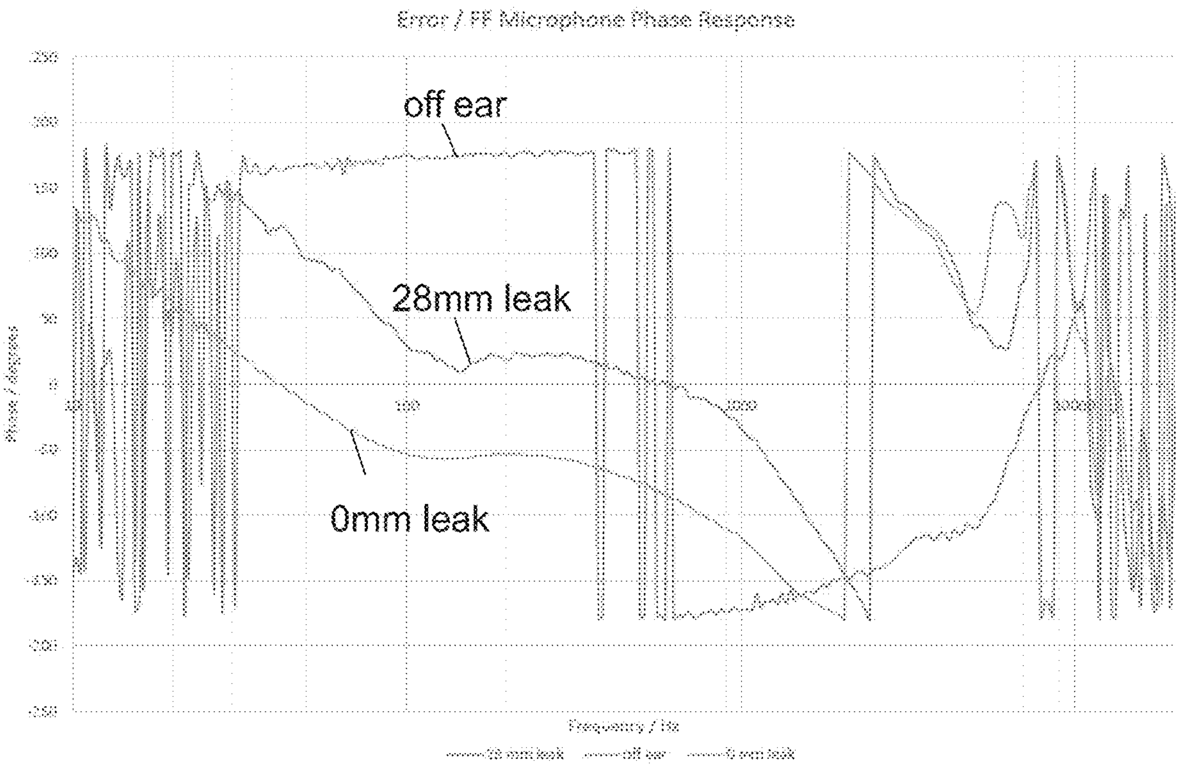
FIG. 6 shows a phase diagram for different wearing or leakage states of a playback device.

Referring to FIG. 6, a signal diagram displaying the phase difference between the error signal and the detection signal for different wearing states of a headphone or playback device is shown. For example, one phase difference signal corresponds to a 0 mm leak, another phase difference signal corresponds to a 28 mm leak and a third phase difference signal corresponds to an off ear state with a leakage that is larger than an acceptable maximum leakage, for example. These leakages are derived from a customised leakage adaptor, and are equivalent to a minimum and maximum realistic acoustic leakage. As can be seen from the diagram, in a frequency range from above 30 Hz to around 400 Hz, the phase difference in the off ear state is around 180°, whereas in the two other wearing states the phase difference is significantly different, in particular lower. Hence, for example, evaluation of the phase difference in the mentioned frequency range, in particular by comparing it to a phase threshold value, can give a good indication that the playback device is in or going to the on ear state.

2. Adaptive, Acoustically Leaky Earphone

Another embodiment features an earphone with a driver, a rear volume and a front volume, e.g. like shown in FIG. 3. The rear volume has a rear vent which is damped with an acoustic resistor. The front volume has a front vent which is damped with an acoustic resistor. The physical shape of the earphone dictates that when placed into an ear there is often an acoustic leakage between the ear canal and the earphone housing. This leakage may change depending on the shape of the ear, and how the earphone is sitting in the ear. A FF microphone FF_MIC is placed on the rear of the earphone such that it detects ambient noise but does not detect a significant signal from the driver. An error microphone FB_MIC is placed in close proximity to the front face of the driver such that it detects the drivers signal and the ambient noise signal.

The noise signal from the FF microphone is, controlled by the sound control processor SCP, passed through the FF filter which outputs an anti-noise signal via the driver SP such that the superposition of the anti-noise signal and the ambient noise creates at least some noise cancellation. The error signal from the error microphone FB_MIC is passed into the signal processor and controls the FF filter such that the anti-noise signal changes based on the acoustic leakage between the ear canal walls and the earphone body. In this embodiment, the resultant filter response is analysed at at least one frequency and compared with an acoustics response that is representative of the earphone being at an extremely high leak. If the resultant filter response exceeds this acoustics response, the earphone enters an off ear state. This off ear state may stop adaption and set a filter for a medium acoustic leakage. In this off ear state, the signals from both microphones are monitored again at at least one frequency and when the phase difference exceeds a predefined threshold the earphone is returned to an on ear state, as described before in section 1 in conjunction with FIG. 6.

In the case that voice is present, the off ear detection still runs. In the case that quiet music is played from the driver, the off ear detection can still run. In the case that the music is substantially louder than the ambient noise, an alternative off ear detection metric may run as described in section 5 below.

In this embodiment, the resultant FF filter may be arranged according to ams patent application EP17189001.5.

3. Non-Adaptive Earphone

In another embodiment, the ANC headphones as previously described do not have an adaption means, i.e. feature a constant for the response of the feedforward filter. The FF filter is fixed. In this embodiment, an approximation to the ANC performance is made. If ANC performance is substantially worse than what is expected, the playback device is assumed to be off the ear. For example, the ANC performance is approximated by dividing the energy levels of the error microphone and the FF microphone.

The headphone can then enter an off ear state. The on ear state can be triggered in exactly the same way or at least similar as for an adaptive headphone by monitoring the phase difference between the two microphones, as described before e.g. in section 1 in conjunction with FIG. 6.

In the case that voice is present, a voice activity detector may pause the off ear detection algorithm to avoid false positives. In the case that music is present, the energy level of the music, offset by the driver response may be subtracted from the energy level of the signal at the error microphone FB_MIC.

4. Headphone or Earphone with Hybrid ANC

In this embodiment, the headphone may be as described in previous embodiments, but also features FB ANC in addition to FF ANC. For FB ANC, the FB microphone FB_MIC is connected to the driver via a FB filter, which may or may not be adaptive.

The detection of reasons described previously still apply for such embodiments with hybrid ANC.

5. Triggered by Music

Another embodiment may or may not feature noise cancellation, but adapts a filter in accordance with a response of the driver SP changing due to a varying acoustic leakage between the earphone and the ear canal. This filter may be used as all or part of a music compensation filter to compensate for music being attenuated by a feedback noise cancellation system, or may be used to compensate for the driver response changing due to the leakage.

Figure 7:
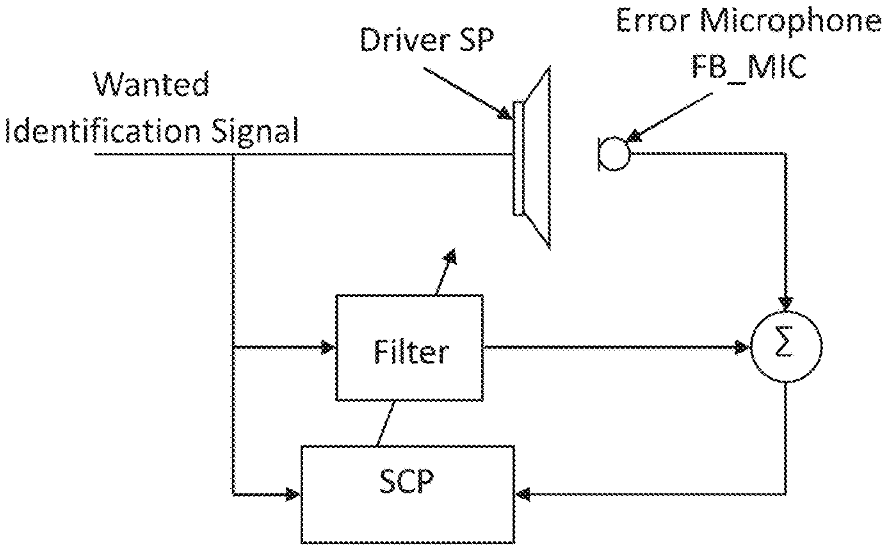
FIG. 7 shows a block diagram of a system with an adjustable identification filter.

Referring to FIG. 7, it shows an arrangement of this filter. In this case, the filter is adapted to match the acoustic “driver to error microphone” transfer function. In this embodiment, the headphone features at least the error microphone FB_MIC, wherein the presence of the feedforward microphone FF_MIC is not excluded. Here, a known identification signal WIS (e.g. a music signal or other payload audio signal) is output from the driver SP as a reference. The identification signal WIS is also filtered with the adaptive filter.

The off ear case may be triggered by monitoring the adapted filter and analysing it as previously described. In particular, a similar evaluation as done with an adaptive feedforward filter is performed with the adapted, adjustable filter, e.g. by comparing a gain and/or gradient to respective associated threshold values.

In this case, the on ear case may be triggered by monitoring the phase difference between the error signal from the error microphone FB_MIC and the known identification signal WIS driving the speaker SP.

6. Quiet Ambient Noise and No Music

In this embodiment, an adaptive or non-adaptive noise cancelling earphone with a FF and a FB microphone is presented. In this case, the ambient noise may be extremely quiet, such that any useful signal from the microphones is in part masked by electronic noise from the microphones or other electronic means. That is, any signal from the microphones contain a significant portion of both useful ambient noise and random electronic noise. Furthermore, no music or only music with a low signal level is being played from the device. This case e.g. represents having the earphone in an ear but where there is negligible ambient noise and no useful sound is being played out of the driver.

In this case, the previously detailed on/off ear detection methods will not be able to run reliably because the microphones cannot detect a useable signal from ambient noise or music playback.

Figure 8:
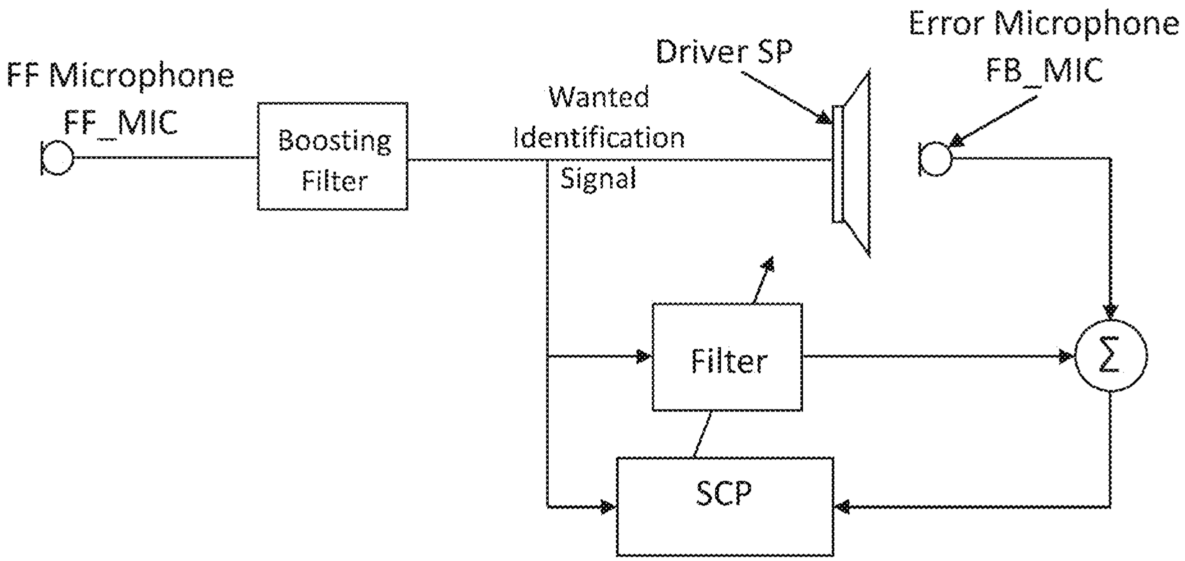
FIG. 8 shows a block diagram of a further system with an adjustable identification filter.

In this case, a similar approach as described above in section 5 may be used. For example, an identification signal WIS is generated by changing the filter between the FF microphone and the driver such that a small degree of noise boosting occurs at the FB microphone. Referring to FIG. 8, instead of changing the FF ANC filter, a dedicated boosting filter can be applied to the noise signal of the FF microphone FF_MIC in order to generate the identification signal WIS. This identification signal WIS can be used to adjust the adjustable filter to match the acoustic “driver to error microphone transfer function”, as described above.

With this process, the FB microphone can detect a useful signal from the driver, but because the filtered noise signal WIS from the FF microphone still contains a significant portion of quiet ambient noise the signal from the driver is largely coherent with the quiet ambient noise and is as such less perceivable to the user than playing an uncorrelated signal from the driver.

In this case, a useful identification signal WIS is played via the driver, which is barely detectable to the user, and can be used as in section 5, where a known identification signal WIS is played from the driver, to detect if the earphone is on or off the ear.

7. Mobile Handset

Another embodiment implements a mobile handset with a FF microphone FF_MIC and an error microphone FB_MIC, e.g. as shown in FIG. 5. When the handset is placed on the ear, a partially closed air volume exists in the concha cavity with an acoustic leakage, and some ANC can take place. In this environment, the ANC would typically have some form of adaption as the acoustic leakage is liable to change significantly at each use. On and off ear detection can occur according to sections 1 or 2, for example.

Where applicable any combination of these embodiments as described in the previous sections is plausible. For example, an adaptive earphone may use off ear detection based on the FF filter and phase difference between the two microphones, but may switch to be triggered by music if the ambient noise level is quiet or the ratio of music to ambient noise is high.

In the following text, further aspects of the present disclosure are specified. The individual aspects are enumerated in order to facilitate the reference to features of other aspects.

1. An audio system for an ear mountable playback device comprising a speaker and an error microphone that senses or predominantly senses sound being output from the speaker, the audio system comprising a sound control processor that is configured to

- controlling and/or monitoring a playback of a detection signal or a filtered version of the detection signal via the speaker;
- recording an error signal from the error microphone; and
- determining whether the playback device is in a first state, where the playback device is worn by a user, or in a second state, where the playback device is not worn by a user, based on processing of the error signal.

2. The audio system according to aspect 1, wherein the sound control processor is configured to determine the first state based on an evaluation of a phase difference between the detection signal and the error signal.

3. The audio system according to aspect 2, wherein the sound control processor is configured to determine the first state, if the phase difference between the detection signal and the error signal exceeds a phase threshold value at one or more predefined frequencies.

4. The audio system according to aspect 2 or 3, wherein the evaluation of the phase difference is performed in the frequency domain.

5. The audio system according to one of aspects 1 to 4, which is configured to perform noise cancellation.

6. The audio system according to aspect 5, wherein the playback device further comprises a feedforward microphone that predominantly senses ambient sound and wherein the sound control processor is further configured to

- recording a noise signal from the feedforward microphone and using the noise signal as the detection signal;
- filtering the detection signal with a feedforward filter; and
- controlling the playback of the filtered detection signal via the speaker.

7. The audio system according to aspect 6, wherein the sound control processor is configured to determine the first state based on an evaluation of a performance of the noise cancellation as a function of the error signal and the noise signal or detection signal.

8. The audio system according to aspect 6 or 7, wherein the sound control processor is configured to determine the second state based on an evaluation of a performance of the noise cancellation as a function of the error signal and the noise signal or detection signal.

9. The audio system according to aspect 7 or 8, which further comprises a voice activity detector for determining whether a voice signal is recorded with the error microphone and/or the feedforward microphone, wherein the sound control processor is configured to pause a determination of the first and/or the second state, if the voice signal is determined to be recorded.

10. The audio system according to one of aspects 7 to 9, wherein the sound control processor is configured to evaluate the performance of the noise cancellation by determining an energy ratio between the error signal and the noise signal or detection signal.

11. The audio system according to aspect 10, wherein the sound control processor is configured, if a music signal is additionally played via the speaker, to take an energy level of the music signal into account when determining the energy ratio.

12. The audio system according to one of aspects 7 to 11, wherein a filter response of the feedforward filter is constant and/or is kept constant by the sound control processor at least during the determination of the state of the playback device.

13. The audio system according to aspect 6, wherein the sound control processor is configured

- to adjust a filter response of the feedforward filter based on the error signal; and
- to determine the second state based on an evaluation of the filter response of the feedforward filter at at least one predetermined frequency.

14. The audio system according to aspect 13, wherein the sound control processor is configured to determine the second state if the filter response of the feedforward filter at the at least one predetermined frequency exceeds a response threshold value.

15. The audio system according to aspect 13 or 14, wherein the sound control processor is configured to determine the second state by determining a linear regression of the filter response of the feedforward filter in a predefined frequency range, the linear regression being defined by at least a filter gradient and a filter gain, and by evaluating the filter gradient and/or the filter gain.

16. The audio system according to aspect 15, wherein the sound control processor is configured to determine the second state if at least one of the following applies:

- the filter gradient exceeds a threshold gradient value;
- the filter gain exceeds a threshold gain value.

17. The audio system according to aspect 15 or 16, wherein a lower limit of the predefined frequency range is between 40 Hz and 100 Hz and an upper limit of the predefined frequency range is between 100 Hz and 800 Hz.

18. The audio system according to one of aspects 6 to 17, wherein the feedforward microphone senses only a negligible portion of the sound being output from the speaker.

19. The audio system according to one of aspects 1 to 18, wherein the detection signal is an identification signal, and wherein the sound control processor is configured

- to control and/or monitor the playback of the identification signal via the speaker;
- to filter the identification signal with an adjustable filter;
- to adjust the adjustable filter based on a difference between the filtered identification signal and the error signal, in particular such that the adjustable filter approximates an acoustic transfer function between the speaker and the error microphone; and to determine the second state based on an evaluation of a filter response of the adjustable filter at at least one further predetermined frequency.

20. The audio system according to aspect 19, wherein the identification signal is one of the following or a combination of one of the following:

a music signal;

a payload audio signal;

a filtered version of a noise signal that is recorded from a microphone predominantly sensing ambient sound.

21. The audio system according to aspect 19 or 20, wherein the sound control processor is configured to determine the second state if the filter response of the adjustable filter at the at least one further predetermined frequency exceeds an identification response threshold value.

22. The audio system according to one of aspects 19 to 21, wherein the sound control processor is configured to determine the second state by determining a linear regression of the filter response of the adjustable filter in a further predefined frequency range, the linear regression being defined by at least an identification filter gradient and an identification filter gain, and by evaluating the identification filter gradient and/or the identification filter gain.

23. The audio system according to aspect 22, wherein the sound control processor is configured to determine the second state if at least one of the following applies:

the identification filter gradient exceeds an identification threshold gradient value;

the identification filter gain exceeds an identification threshold gain value.

24. The audio system according to aspect 22 or 23, wherein a lower limit of the further predefined frequency range is between 40 Hz and 100 Hz and an upper limit of the further predefined frequency range is between 100 Hz and 800 Hz.

25. The audio system according to one of the preceding aspects, wherein the sound control processor is configured to control the audio system to a low power mode of operation, if the second state is determined, and to a regular mode of operation, if the first state is determined.

26. The audio system according to one of the preceding aspects, wherein the sound control processor is configured to determine whether the playback device is in the first state, only if the playback device is in the second state, and to determine whether the playback device is in the second state, only if the playback device is in the first state.

27. The audio system according to one of the preceding aspects, which includes the playback device.

28. The audio system according to the preceding aspect, wherein the sound control processor is included in a housing of the playback device.

29. The audio system according to one of the preceding aspects, wherein the playback device is a headphone or an earphone.

30. The audio system according to aspect 29, wherein the headphone or earphone is designed to be worn with a variable acoustic leakage between a body of the headphone or earphone and a head of a user.

31. The audio system according to one of aspects 1 to 27, wherein the playback device is a mobile phone.

32. A signal processing method for an ear mountable playback device comprising a speaker and an error microphone that senses or predominantly senses sound being output from the speaker, the method comprising controlling and/or monitoring a playback of a detection signal or a filtered version of the detection signal via the speaker;

recording an error signal from the error microphone; and determining whether the playback device is in a first state, where the playback device is worn by a user, or in a second state, where the playback device is not worn by a user, based on processing of the error signal.

33. The method according to aspect 32, wherein the first state is determined based on an evaluation of a phase difference between the detection signal and the error signal.

34. The method according to aspect 33, wherein the first state is determined, if the phase difference between the detection signal and the error signal exceeds a phase threshold value at one or more predefined frequencies.

35. The method according to aspect 33 or 34, wherein the evaluation of the phase difference is performed in the frequency domain.

36. The method according to one of aspects 32 to 35, further comprising performing noise cancellation.

37. The method according to aspect 36, wherein the playback device further comprises a feedforward microphone that predominantly senses ambient sound and wherein the method further comprises recording a noise signal from the feedforward microphone and using the noise signal as the detection signal;

filtering the detection signal with a feedforward filter; and controlling the playback of the filtered detection signal via the speaker.

38. The method according to aspect 37, further comprising determining the first state and/or the second state based on an evaluation of a performance of the noise cancellation as a function of the error signal and the noise signal or detection signal.

39. The method according to aspect 37, further comprising adjusting a filter response of the feedforward filter based on the error signal; and determining the second state based on an evaluation of the filter response of the feedforward filter at at least one predetermined frequency.

40. The method according to one of aspects 32 to 39, wherein the detection signal is an identification signal, the method further comprising controlling and/or monitoring the playback of the identification signal via the speaker;

filtering the identification signal with an adjustable filter;

adjusting the adjustable filter based on a difference between the filtered identification signal and the error signal, in particular such that the adjustable filter approximates an acoustic transfer function between the speaker and the error microphone; and determining the second state based on an evaluation of a filter response of the adjustable filter at at least one further predetermined frequency.

The invention claimed is:

1. An audio system for an ear mountable playback device comprising a speaker, a feedforward microphone that predominantly senses ambient sound and an error microphone that senses sound being output from the speaker, the audio system being configured to perform noise cancellation and comprising a sound control processor that is configured to record a noise signal from the feedforward microphone and using the noise signal as a detection signal;

filter the detection signal with a feedforward filter;

control a playback of the filtered detection signal via the speaker;

record an error signal from the error microphone; and determine whether the playback device is in a first state, where the playback device is worn by a user, or in a second state, where the playback device is not worn by a user, based on processing of the error signal and wherein the sound control processor is configured to determine the first state and/or the second state based on an evaluation of a performance of the noise cancellation as a function of the error signal and the detection signal.

2. The audio system according to claim 1, wherein the sound control processor is configured to determine the second state based on an evaluation of a performance of the noise cancellation as a function of the error signal and the noise signal or detection signal.

3. The audio system according to claim 1, which further comprises a voice activity detector for determining whether a voice signal is recorded with the error microphone and/or the feedforward microphone, wherein the sound control processor is configured to pause a determination of the first and/or the second state, if the voice signal is determined to be recorded.

4. The audio system according to claim 1, wherein the sound control processor is configured to evaluate the performance of the noise cancellation by determining an energy ratio between the error signal and the noise signal or detection signal.

5. The audio system according to claim 4, wherein the sound control processor is configured, if a music signal is additionally played via the speaker, to take an energy level of the music signal into account when determining the energy ratio.

6. The audio system according to claim 1, wherein a filter response of the feedforward filter is constant and/or is kept constant by the sound control processor at least during the determination of the state of the play back device.

7. The audio system according to claim 1, wherein the sound control processor is configured to adjust a filter response of the feedforward filter based on the error signal; and to determine the second state based on an evaluation of the filter response of the feedforward filter at at least one predetermined frequency.

8. The audio system according to claim 7, wherein the sound control processor is configured to determine the second state if the filter response of the feedforward filter at the at least one predetermined frequency exceeds a response threshold value.

9. The audio system according to claim 1, wherein the sound control processor is configured to determine the first state based on an evaluation of a phase difference between the detection signal and the error signal.

10. The audio system according to claim 9, wherein the sound control processor is configured to determine the first state, if the phase difference between the detection signal and the error signal exceeds a phase threshold value at one or more predefined frequencies.

11. The audio system according to claim 1, wherein the detection signal is an identification signal, and wherein the sound control processor is configured to control and/or monitor the playback of the identification signal via the speaker;

to filter the identification signal with an adjustable filter;

to adjust the adjustable filter based on a difference between the filtered identification signal and the error signal, in particular such that the adjustable filter approximates an acoustic transfer function between the speaker and the error microphone; and to determine the second state based on an evaluation of a filter response of the adjustable filter at at least one further predetermined frequency.

12. The audio system according to claim 11, wherein the identification signal is one of the following or a combination of one of the following:

a music signal;

a payload audio signal;

a filtered version of a noise signal that is recorded from a microphone predominantly sensing ambient sound.

13. The audio system according to claim 11, wherein the sound control processor is configured to determine the second state by determining a linear regression of the filter response of the adjustable filter in a further predefined frequency range, the linear regression being defined by at least an identification filter gradient and an identification filter gain, and by evaluating the identification filter gradient and/or the identification filter gain.

14. The audio system according to claim 1, wherein the sound control processor is configured to control the audio system to a low power mode of operation, if the second state is determined, and to regular mode of operation, if the first state is determined.

15. The audio system according to claim 1, wherein the sound control processor is configured to determine whether the playback device is in the first state, only if the playback device is in the second state, and to determine whether the playback device is in the second state, only if the playback device is in the first state.

16. The audio system according to claim 1, wherein the playback device is a headphone or an earphone or a mobile phone.

17. An audio system for an ear mountable playback device comprising a speaker, a feedforward microphone that predominantly senses ambient sound and an error microphone that senses sound being output from the speaker, the audio system being configured to perform noise cancellation and comprising a sound control processor that is configured to record a noise signal from the feedforward microphone and using the noise signal as a detection signal;

filter the detection signal with a feedforward filter;

control a playback of the filtered detection signal via the speaker;

record an error signal from the error microphone; and determine whether the playback device is in a first state, where the playback device is worn by a user, or in a second state, where the playback device is not worn by a user, based on processing of the error signal adjust a filter response of the feedforward filter based on the error signal; and determine the second state based on an evaluation of the filter response of the feedforward filter at least one predetermined frequency; and determine the second state by determining a linear regression of the filter response of the feedforward filter in a predefined frequency range, the linear regression being defined by at least a filter gradient and a filter gain, and by evaluating the filter gradient and/or the filter gain.

18. The audio system according to claim 17, wherein the sound control processor is configured to determine the second state if at least one of the following applies:

the filter gradient exceeds a threshold gradient value;

the filter gain exceeds a threshold gain value.

19. A signal processing method for an ear mountable playback device comprising a speaker, a feedforward microphone that predominantly senses ambient sound and an error microphone that senses sound being output from the speaker, the method comprising recording a noise signal from the feedforward microphone and using the noise signal as a detection signal;

filtering the detection signal with a feedforward filter;

controlling a playback of the filtered detection signal via the speaker;

recording an error signal from the error microphone;

performing noise cancellation based on at least one of the noise signal and the error signal; and determining whether the playback device is in a first state, where the playback device is worn by a user, or in a second state, where the playback device is not worn by a user, based on processing of the error signal, and wherein the sound control processor is configured to determine the first state and/or the second state based on an evaluation of a performance of the noise cancellation as a function of the error signal and the detection signal.

* * * * *